United States Patent [19]
Kakugo et al.

[11] Patent Number: 5,424,379
[45] Date of Patent: Jun. 13, 1995

[54] PROCESS FOR SELECTIVE PRODUCTION OF CIS-1,4-POLYBUTADIENE

[75] Inventors: Masahiro Kakugo, Narashino; Tatsuya Miyatake, Ichihara; Koozi Mizunuma, Ichihara; Yoshio Yagi, Ichihara; Kazuhiro Watanabe, Ichihara, all of Japan

[73] Assignee: Sumitomo Chemical Company, Limited, Osaka, Japan

[21] Appl. No.: 229,311

[22] Filed: May 16, 1994

Related U.S. Application Data

[60] Division of Ser. No. 95,050, Jul. 22, 1993, Pat. No. 5,349,034, which is a continuation of Ser. No. 625,442, Dec. 11, 1990, abandoned.

[30] Foreign Application Priority Data

Dec. 18, 1989 [JP] Japan ............... 1-329081
Jan. 19, 1990 [JP] Japan ............... 2-011642

[51] Int. Cl.$^6$ .............. C08F 4/649; C08F 136/06
[52] U.S. Cl. ................. 526/128; 526/139; 526/140; 526/141; 526/142; 526/143; 526/165; 526/335; 526/340.4; 502/125; 502/126
[58] Field of Search ........... 526/128, 142, 143, 340.4, 526/139, 140, 141, 165

[56] References Cited

U.S. PATENT DOCUMENTS

| | | | |
|---|---|---|---|
| 3,116,272 | 12/1963 | Stewart et al. | 526/340.4 X |
| 3,350,378 | 10/1967 | Marcinkowski . | |
| 3,567,702 | 3/1971 | Ikeda et al. . | |
| 3,681,315 | 8/1972 | Yagi et al. | 526/143 X |
| 4,098,980 | 7/1978 | Murkle et al. | 526/335 X |
| 4,555,497 | 11/1985 | Coleman, III et al. | 526/142 X |
| 4,622,309 | 11/1986 | Coleman, III et al. | 526/142 X |
| 5,180,000 | 1/1994 | Kakugo et al. | 526/142 X |

FOREIGN PATENT DOCUMENTS

| | | | |
|---|---|---|---|
| 0627741 | 9/1961 | Canada | 526/142 |
| 0241560 | 10/1987 | European Pat. Off. . | |
| 1344552 | 10/1963 | France . | |
| 1800713 | 4/1969 | Germany . | |

OTHER PUBLICATIONS

Natta et al, "Stereospecific Polymerization of Conjugated Diolefins . . .", Chimica e Industria, 40, 362 (1957).

*Synthesis of Syndiotactic Poly-1,2-(4-methyl-1,3-pentadiene)* Adolfo Zambelli et al., Macromolecules 1989, 22, pp. 2126-2128.

Primary Examiner—Fred Teskin
Attorney, Agent, or Firm—Stevens, Davis, Miller & Mosher

[57] ABSTRACT

A catalyst for production of 1,4-polybutadiene which comprises as the catalyst component (A) a transition metal compound represented by the formula $M(R)_l(OR')_m X_{n-(l+m)}$, wherein M denotes a transition metal atom, R and R' each denote a hydrocarbon group of 1-20 carbon atoms, X denotes a halogen atom, and l, m and n denote numerals satisfying the equations $l \geq 0$, $m \geq 0$ and $n-(l+m) \geq 0$, n corresponding to the valence of the transition metal, as the catalyst component (B) an organoaluminum compound represented by the formula $AlR^1_a X'_{3-a}$, wherein $R^1$ denotes a hydrocarbon group of 1-20 carbon atoms, X denotes a halogen atom, and a denotes a numeral satisfying the equation $1 \geq a \geq 3$, or an aluminoxane obtained by the reaction of said organoaluminum compound with water, and as the catalyst component (C) an organic compound having at least two hydroxyl groups.

2 Claims, 2 Drawing Sheets

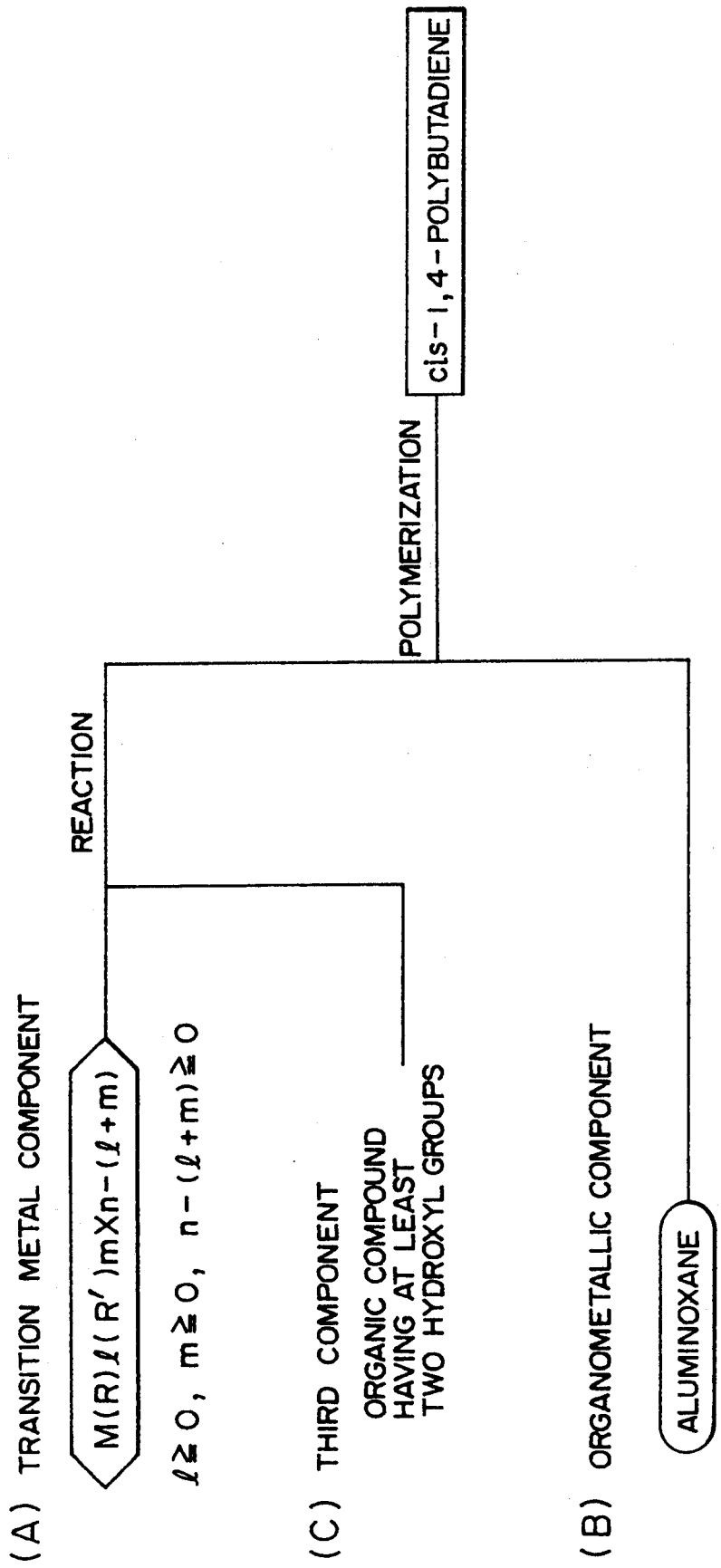

PROCESS FOR SELECTIVE PRODUCTION OF CIS-1,4-POLYBUTADIENE

This is a division of application Ser. No. 08/095,050, filed Jul. 22, 1993, now U.S. Pat. No. 5,349,034 which in turn is a continuation of application Ser. No. 07/625,442, filed Dec. 11, 1990, now abandoned.

BACKGROUND OF THE INVENTION

1. Field of the Invention

The present invention relates to a polymerization catalyst which selectively gives trans- or cis-1,4-polybutadiene and a process for selective production of trans- or cis-1,4-polybutadiene using said catalyst.

In more particular, the present invention relates to a catalyst comprising a transition metal compound and an organoaluminum compound, to a process which gives a butadiene compound polymer wherein at least 50%, usually 60-90%, and under suitable polymerization conditions at least 90%, of the butadiene units contained therein are linked in trans-1,4-configuration by using said catalyst, and to a process for production of a butadiene compound polymer which gives a polybutadiene wherein at least 90% of the butadiene units contained therein are linked in cis-1,4-configuration by using a catalyst comprising a titanium compound, an aluminoxane and an organic compound having at least two hydroxyl groups.

2. Description of the Prior Art

Various processes are so far known for production of diene compound polymers, including radical polymerization, cationic polymerization, anionic polymerization, and coordinated anionic polymerization which uses Ziegler-Natta catalysts. As for systems which give trans-1,4-polybutadiene, there are known, for example, those reported by Natta et al. including the one which uses $TiCl_3$ of a solid catalyst and triethylaluminum (Gazzetta chimica Italiana, 89, 761 (1959)) and the one which uses soluble $VCl_4$ and triethylaluminum (La Chimica e Industria, 41, 116 (1959)). However, these disclosed processes have the disadvantage of low catalytic activity and hence being unsuitable for use in the commercial production.

As for processes for production of polybutadiene having a high cis-1,4 content, there are known (1) a polymerization process which uses a catalyst comprising a trialkylaluminum and titanium tetraiodide (BE 551,851); (2) a polymerization process which uses a catalyst system comprising triisobutylaluminum and titanium tetrabromide (GB 824,201); (3) a polymerization process which uses a catalyst system comprising cobalt chloride and an organometallic compound (BE 573,680); (4) a process which uses a catalyst system comprising triethylaluminum, nickel naphthenate and boron trifluoride (Japanese Patent Application Kokoku (Post-Exam. Publn.) No. 3708198); (5) a process which uses a catalyst comprising tetrabenzyltitanium and methylaluminoxane, and other processes.

Among these processes, the process (5) has the disadvantage of low catalytic activity and hence being difficultly used for the commercial production [(Macromolecules) 22,2126, 1989]. The processes (1), (2) and (3), which use a transition metal catalyst system, are disadvantageous in that the catalyst cannot be removed sufficiently from the polymer formed.

SUMMARY OF THE INVENTION

In such situations, the object of the present invention is to provide a novel soluble catalyst, in place of the above transition metal catalyst, for polymerization of butadiene compounds, a process which gives in a high yield a butadiene compound polymer wherein at least 50%, usually 60-90%, and under suitable polymerization conditions at least 90% of the butadiene units contained therein are linked in trans-1,4-configuration by using said catalyst, and a process which gives in a high yield a cis-1,4-polybutadiene wherein at least 90% of the butadiene units contained therein are linked in cis-1,4-configuration by using the novel soluble catalyst for polymerization of diene compounds.

The present invention relates to a catalyst system comprising a transition metal compound having a specified structure and an organoaluminum compound and to a process which selectively gives in a high yield a trans- or cis-1,4-polybutadiene of a high molecular weight by using said catalyst system.

Thus, the present invention relates to a catalyst for production of 1,4-polybutadiene which comprises as the catalyst component (A), a transition metal compound represented by the general formula $M(R)_l(OR')_m X_{n-(l+m)}$, wherein M denotes a transition metal atom, R and R' independently denote a hydrocarbon group of 1-20 carbon atoms, X denotes a halogen atom, and l, m and n respectively denote numerals satisfying the inequalities $l \geq 0$, $m \geq 0$ and $n-(l+m) \geq 0$, n corresponds to the valence of the transition metal;

as the catalyst component (B), an organoaluminum compound represented by the general formula $AlR^1_a X'_{3-a}$, wherein $R^1$ denotes a hydrocarbon group of 1-20 carbon atoms, X' denotes a halogen atom and a denotes a numeral satisfying the inequality $1 \leq a \leq 3$, alternatively an aluminoxane obtained by the reaction of said organoaluminum compound with water; and as the catalyst component (C), an organic compound having at least two hydroxyl groups represented by the general formula I, II, III, IV, V or VI,

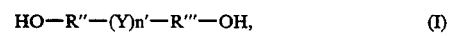

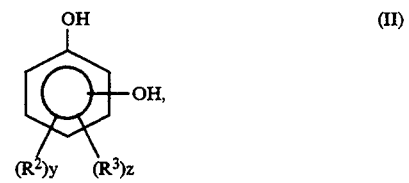

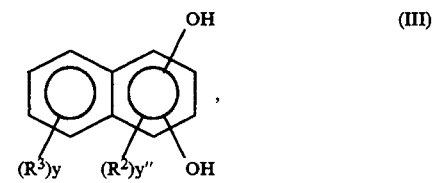

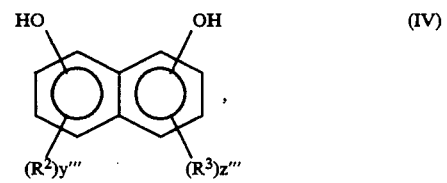

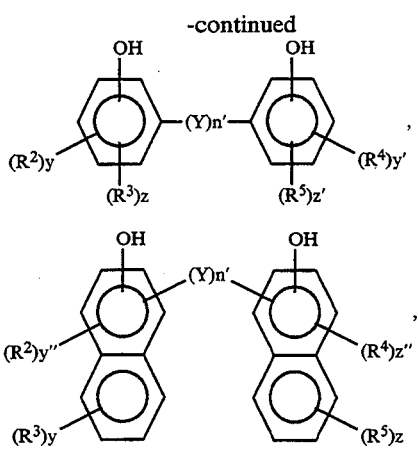

wherein R″ and R‴ independently denote a hydrocarbon group of 1-20 carbon atoms; Y denotes a hydrocarbon group of 1-20 carbon atoms,

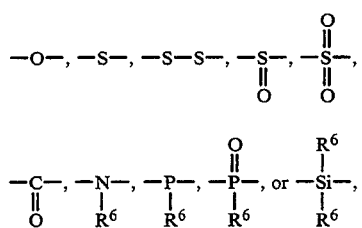

$R^6$ being hydrogen or a hydrocarbon group of 1-6 carbon atoms; $R^2$, $R^3$, $R^4$ and $R^5$ may be the same or different from one another and each denotes a hydrocarbon group of 1-20 carbon atoms, hydroxyl group, nitro group, nitrile group, hydrocarboxy group or halogen atom; n′ denotes 0 or an integer of 1 or more and represents the number of times of repetition of the unit Y; y, y′, Y″, Y‴, z, z′, z″ and z‴ independently denote the number of substituents bonded to the aromatic ring, y, y′, z and z′ being independently 0 or an integer of from 1 to 4, y″ and z″ being 0 or an integer of from 1 to 2, and y‴ and z‴ being independently 0 or an integer of from 1 to 3, as well as to a process for selective production of trans- or cis-1,4-polybutadiene using said catalyst system.

BRIEF DESCRIPTION OF THE DRAWINGS

FIGS. 1 and 2 are each a flow chart for facilitating the understanding of the present invention. These flow charts are merely to illustrate some typical examples of the embodiment of the present invention and in no way limit the scope of the present invention.

DETAILED DESCRIPTION OF THE INVENTION

Figure 1:
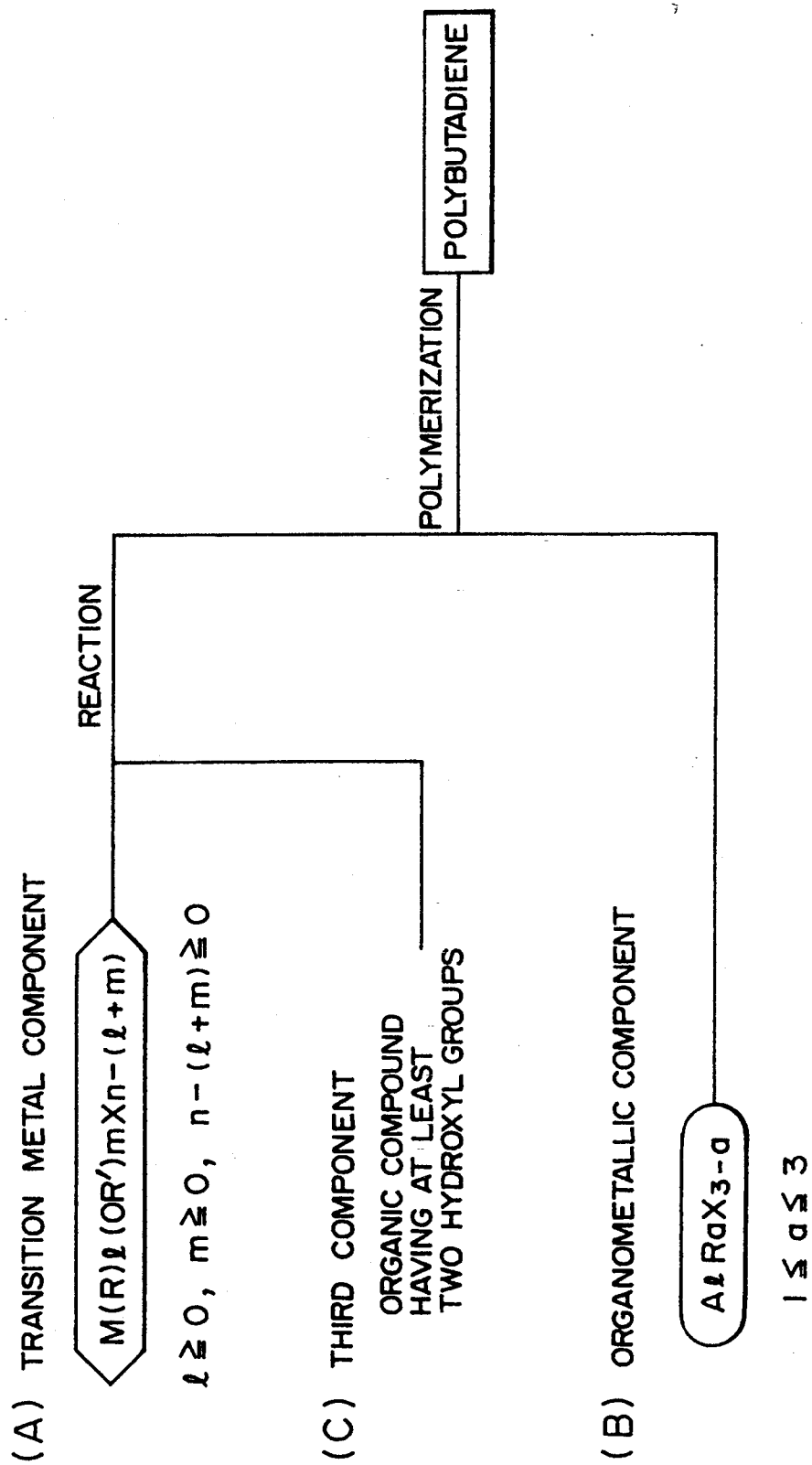

The present invention will be described in detail below.

In the transition metal compound represented by the general formula $M(R)_l(OR')_mX_{n-(l+m)}$ used as the catalyst component (A) in the present invention, M may be, for example, titanium, zirconium, hafnium and vanadium, in particular, titanium and zirconium giving favorable results.

R or R′ is a hydrocarbon group of 1-20 carbon atoms; in particular, preferably used among said groups are an alkyl group of 2-18 carbon atoms and an aryl group of 6-18 carbon atoms.

Specific examples of R or R′ include an alkyl group such as methyl, ethyl, n-propyl, isopropyl, n-butyl, isobutyl, t-butyl, n-amyl, isoamyl, n-hexyl, n-heptyl, n-octyl, n-decyl and n-dodecyl; an aryl group such as phenyl and naphthyl; a cycloalkyl group such as cyclohexyl and cyclopentyl; an allyl group such as propenyl; and an aralkyl group such as benzyl.

In particular, preferably used among them as R are methyl, ethyl, phenyl, benzyl etc., and as R′ are an alkyl group such as n-propyl, isopropyl, n-butyl and t-butyl; and an aryl group such as phenyl.

The halogen atom represented by X may be, for example, chlorine, bromine and iodine; in particular, chlorine is used preferably.

The letters l, m and n respectively denote numerals satisfying the inequalities $l \geq 0$, $m \geq 0$ and $n-(l+m) \geq 0$.

As specific examples of the catalyst component (A), mention may be made of titanium tetrachloride, zirconium tetrachloride, tetraisopropoxytitanium, tetra-n-butoxytitanium, tetra-t-butoxytitanium, diphenoxytitanium dichloride, dinaphthoxytitanium dichloride, tetraisopropoxyzirconium, tetra-n-butoxyzirconium and tetra-t-butoxyzirconium.

As specific examples of the organoaluminum compound represented by the general formula $AlR^1{}_aX'_{3-a}$, wherein $R^1$ denotes a hydrocarbon group of 1-20 carbon atoms, X denotes a halogen atom, and a denotes a numeral satisfying the inequality $1 \leq a \leq 3$, used as the catalyst component (B), there may be mentioned methylaluminum dichloride, ethylaluminum dichloride, n-propylaluminum dichloride, ethylaluminum sesquichloride, dimethylaluminum chloride, diethylaluminum chloride, di-n-propylaluminum chloride, trimethylaluminum, triethylaluminum, triisobutylaluminum, ethyl(dicyclohexyl)aluminum, triphenylaluminum, diethylaluminum hydride, diisobutylaluminum hydride, diethylaluminum bromide, diethylaluminum iodide, etc.

Among them, diethylaluminum chloride, ethylaluminum sesquichloride and ethylaluminum dichloride give particularly favorable results.

To obtain cis-1,4-polybutadiene selectively, on the other hand, there is used, as the catalyst component (B), a polymer of an aluminum compound, namely an aluminoxane which exists in the form of a linear compound represented by the general formula $R^a[(Al(R^a)O]_nAlR^a{}_2$ and/or a cyclic compound represented by the general formula $[Al(R^a)O]_{n+1}$, wherein $R^a$ is an alkyl group of 1-10 carbon atoms, such as methyl, ethyl, propyl, butyl and pentyl, in particular, methyl and ethyl being preferable, and n is an integer of 1 or more, 1-20 being particularly preferable.

Aluminoxane can be obtained by various conventional methods. For example, it can be synthesized by allowing a trialkylaluminum dissolved in a suitable hydrocarbon solvent to contact with water. In this case, the water is preferably allowed to contact with the aluminum compound under mild conditions. Other known methods include one comprising making water vapor contact with an aluminum compound, one comprising gradually adding an organic solvent saturated with water dropwise to a solution of an aluminum compound, and further one comprising allowing hydrated copper sulfate ($CuSO_4.5H_2O$) or hydorated aluminum sulfate [$Al(RSO_4)_3.18H_2O$] to react.

Usually, where an aluminoxane is synthesized from trimethylaluminum and water, a linear compound and a cyclic compound are obtained simultaneously. The molar ratio in the reaction is preferably selected such that the water is equimolar to the aluminum compound.

In the compound, used as the component (C) to give trans-1,4-polybutadiene selectively in the present invention, which is represented by the general formulas below,

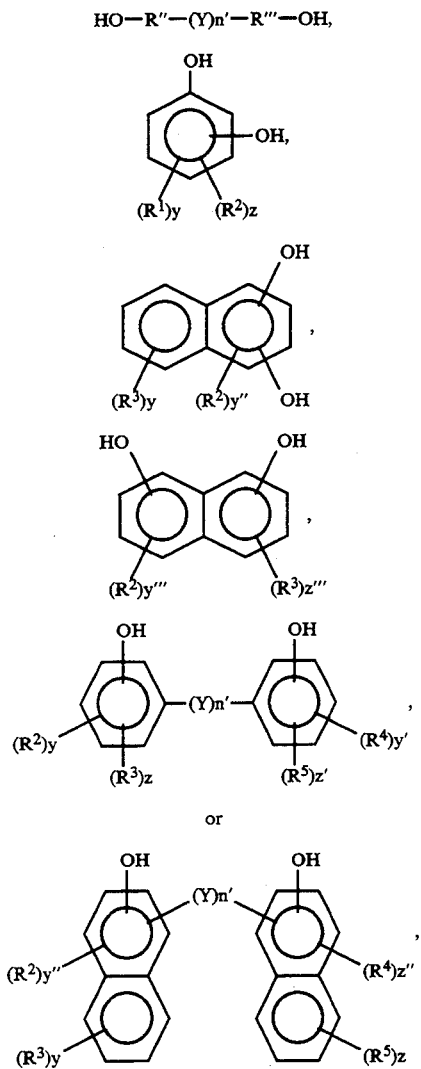

R" and R''' independently denote a hydrocarbon group of 1-20 carbon atoms; and Y denotes a hydrocarbon group of 1-20 carbon atoms,

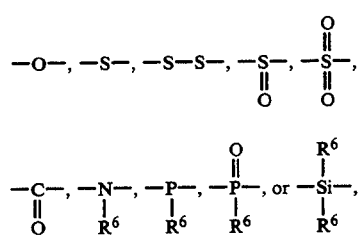

$R^6$ being a hydrocarbon group of 1-6 carbon atoms. Specific examples of the hydrocarbon group of 1-20 carbon atoms denoted by R", R''' and Y include the methylene, ethylene, trimethylene, propylene, diphenylmethylene, isopropylidene, ethylidene, n-propylidene, isopropylidene, n-butylidene and isobutylidene group. Particularly preferably used among them are the methylene, ethylene, ethylidene, isopropylidene and isobutylidene group.

In the above formulas, n' is 0 or an integer of 1 or more and represents the number of times of repetition of the unit Y, particularly 0 or 1 giving favorable results.

$R^2$, $R^3$, $R^4$ and $R^5$ independently denote a hydrocarbon group of 1-20 carbon atoms, hydroxyl group, nitro group, nitrile group, hydrocarbyloxy group or halogen atom. Specific examples of the hydrocarbon group of 1-20 carbon atoms include an alkyl group such as methyl, ethyl, n-propyl, isopropyl, n-butyl, isobutyl, t-butyl, n-amyl, isoamyl, n-hexyl, n-heptyl, n-octyl, n-decyl and n-dodecyl; an aryl group such as phenyl and naphthyl; a cycloalkyl group such as cyclohexyl and cyclopentyl; an allyl group such as propenyl; and an aralkyl group such as benzyl. Particularly preferably used among them are alkyl groups of 1-10 carbon atoms.

The letters y, y', y", y''', z, z', z" and z''' independently denote the number of substituents bonded to the aromatic ring; y, y', z and z' being independently 0 or an integer of from 1 to 4; y" and z" being independently 0 or an integer of from 1 to 2; and y''' and z''' being independently 0 or an integer of from 1 to 3.

In the compound, used as the component (C) to give cis-1,4-polybutadiene selectively in the present invention, which is represented by the general formulas below,

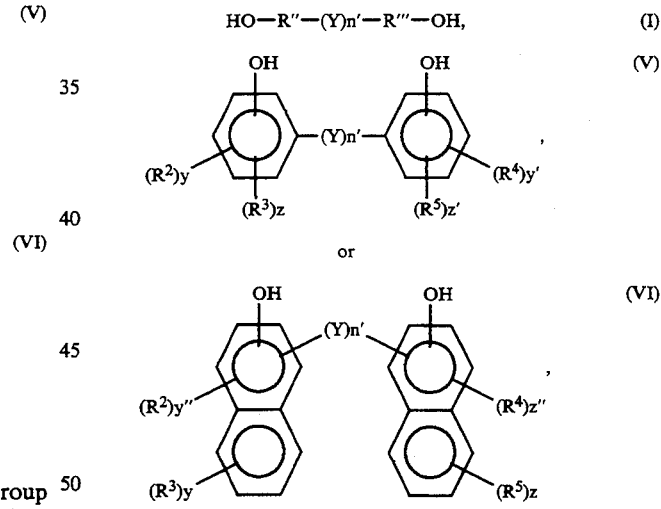

R" and R''' independently denote a hydrocarbon group of 1-20 carbon atoms, and Y denotes a hydrocarbon group of 1-20 carbon atoms,

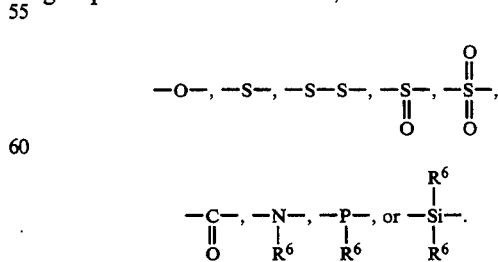

$R^6$ being hydrogen or a hydrocarbon group of 1-6 carbon atoms. Specific examples of the hydrocarbon group of 1-20 carbon atoms denoted by R", R''' and Y include the methylene, ethylene, trimethylene, propylene, diphenylmethylene, isopropylidene, ethylidene, n-propylidene, n-butylidene, and isobutylidene group. Particularly preferably used among them are the methylene, ethylene, ethylidene, isopropylidene, and isobutylidene group.

In the above formulas, n' is 0 or an integer of 1 or more and represents the number of repetition of the unit Y, particularly 0 or 1 giving favorable results. $R^2$, $R^3$, $R^4$ and $R^5$ independently denote a hydrocarbon group of 1-20 carbon atoms, hydroxyl group, nitro group, nitrile group, hydrocarbyloxy group or halogen atom. Specific examples of the hydrocarbon group of 1-20 carbon atoms include an alkyl group such as methyl, ethyl, n-propyl, isopropyl, n-butyl, isobutyl, t-butyl, n-amyl, isoamyl, n-hexyl, n-heptyl, n-octyl, n-decyl and n-dodecyl; an aryl group such as phenyl and naphthyl; a cycloalkyl group such as cyclohexyl and cyclopentyl; an allyl group such as propenyl; and an aralkyl group such as benzyl. Particularly favorably used among them are alkyl groups of 1-10 carbon atoms.

The letters y, y', y", z, z' and z" independently denote the number of substituents bonded to the aromatic ring; y, y', z and z' being independently 0 or an integer of from 1 to 4; and y" and z" being independently 0 or an integer of from 1 to 2.

Specific examples of the catalyst component (C) include 2,4-dihydroxypentane, ethylene glycol, β-thiodiglycol, diethanolamine, 2,2'-dihydroxydiphenyl ether, 2,2'-thiodiphenol, 4,4'-dimethyl-6,6'-dicyclohexyl-2,2'-methylenediphenol, 2,2'-dihydroxy-3,3'-di-t-butyl-5,5'-dimethyldiphenyl sulfide, 2,2'-dihydroxy-3,3'-di-t-butyl-5,5'-dimethyldiphenylmethane, 2,2'-dihydroxy-3,3'-di-t-butyl-5,5'-dimethyldiphenyl ether, 2,2'-dihydroxy-3,3',5,5'-tetra-t-butyldiphenyl sulfide, 2,2'-dihydroxydiphenylamine, 2,4-dihydroxypentane, 2-(2-hydroxypropyl)phenol, catechol, resorcinol, 4-isopropylcatechol, 3-methoxycatechol, 1,8-dihydroxynaphthalene, 1,2-dihydroxynaphthalene, 2,2'-biphenyldiol, 1,1'-bi-2-naphthol, 2,2'-dihydroxy-6,6'-dimethylbiphenyl, 4,4',6,6'-tetra-t-butyl-2,2'-methylenediphenol, 4,4'-dimethyl-6,6'-di-t-butyl-2,2'-methylenediphenol, 4,4',6,6'-tetramethyl-2,2'-isobutylidenediphenol and 2,2'-dihydroxy-3,3'-di-t-butyl-5,5'-dimethyldiphenyl sulfide. Among them, particularly 2,4-dihydroxypentane, catechol, 2,2'-biphenyldiol, 1,1'-biphenyl-2-naphthol, 4,4',6,6'-tetra-t-butyl-2,2'-methylenediphenol, 4,4'-dimethyl-6,6'-di-t-butyl-2,2'-methylenediphenol, 4,4',6,6'-tetramethyl-2,2'-isobutylidenediphenol, 2,2'-dihydroxy-3,3'-di-t-butyl-5,5'-dimethylphenyl sulfide, 2,2'-dihydroxy-4,4',6,6'-tetra-t-butyldiphenyl sulfide, and 2,2'-dihydroxydiphenyl sulfide give favorable results.

Where these catalyst systems are used for the polymerization of diene compounds, the catalyst components (A), (B) and (C) are employed.

The catalyst component (C) must be reacted with the catalyst component (A) prior to being used for polymerization.

The reaction may be performed in a hydrocarbon solvent or in a polar solvent, such as halogenated hydrocarbons and ethers, at a temperature of −20° C. to 200° C. The catalyst component (C) may be directly used in the reaction but, where the catalyst component (A) is a halogen-containing transition metal compound, it is also possible to add ammonia, pyridine, alkylamines etc. to the reaction system in order to capture the hydrogen halide which evolves during the reaction. In this case, the hydrogen halide-containing compound deposited is preferably removed before the reaction system is used for polymerization.

The catalyst component (C) may be converted beforehand into a metal alcoholate, metal phenolate, metal naphtholate etc. by reaction with either an alkali metal such as metallic sodium or an alkali metal hydride such as lithium hydride and then used for polymerization. In this case, the alkali metal salts deposited is preferably removed before the reaction product is used for polymerization. Where the catalyst component (A) contains a hydrocarbyloxy group, it may be converted into an ester compound by reaction with a carboxylic acid such as acetic acid and then used for polymerization.

It is estimated that the reaction of a transition metal compound with an organic compound having at least two hydroxyl groups results in the formation of a compound having a structure wherein at least two hydroxyl groups of the organic compound are bonded to one and the same transition metal atom.

As for the amounts of the respective catalyst components to be added, the catalyst component (A) may be used in the range of $10^{-10}$ to $10^{-3}$ mmol/l, preferably $10^{-7}$ to $10^{-2}$ mmol/l, in terms of the transition metal atom. The catalyst component (B) may be used, relative to the catalyst component (A), in the range of 1 to 100,000, preferably 10 to 10,000, in terms of the ratio of aluminum atom to transition metal atom. The catalyst component (C) may be used in a molar ratio of 0.01 to 4 relative to the transition metal atom of the catalyst component (A).

As specific examples of the butadiene compound used in the present invention, mention may be made of 1,3-butadiene and isoprene.

The method of polymerization is not to be particularly limited in the present invention. For example, there may be used, as the solvent for polymerization, aliphatic hydrocarbon solvents such as butane, pentane, hexane, heptane and octane; aromatic hydrocarbon solvents such as benzene and toluene; halogenated hydrocarbon solvents such as methylene chloride; and further butadiene compounds of the monomer.

The polymerization may be performed batch-wise or continuously.

The polymerization temperature may be selected from the range of −50° C. to 200° C., preferably −20° C. to 100° C.

PREFERRED EMBODIMENTS OF THE INVENTION

The present invention will be described in more detail below with reference to Examples, but it is in no way limited thereto.

The microstructure of the polymer obtained in the polymerization of butadiene in Examples was determined by the method of Morero based on the infrared analysis (La Chimica e Industria, 41, 758 (1959) and from the signal intensity ratio in the $^{13}C$ NMR spectra. The assignment of signals in the NMR spectra was made with reference to the assignment described in Kobunshi, 29, 397-402 (1972). The infrared analysis was made on a Type IR-810 spectrophotometer manufactured by Hitachi Bunko Kogyo K.K. and the NMR determination was made by using an FX-100 spectrometer manufactured by Nippon Denshi K.K.

Examples 1 to 10

1) Reaction of the catalyst component (A) with the catalyst component (C)

In a flask of 100 ml inner volume equipped with a stirrer was placed 0.9 mmol of 2,2'-dihydroxy-3,3'-di-t-butyl-5,5'-dimethyldiphenyl sulfide, then the inner atmosphere was replaced with argon, 50 ml of dried n-butyl ether was added, and the resulting mixture was stirred to form a solution. Then, 0.9 mmol of tetraisopropoxytitanium was added to the solution and allowed to react with stirring at 25° C. for 2 hours. The reaction mixture was then allowed to stand, the supernatant was removed, and the precipitate was collected and washed. The resulting product is referred to as the catalyst component (1).

(2) The same procedures as in (1) were followed except for using 0.9 mmol of titanium tetrachloride as the catalyst component (A) in place of tetraisopropoxytitanium. The resulting product is referred to as the catalyst component (2).

(3) The same procedures as in (1) were followed except for using 0.9 mmol of titanium tetrabromide as the catalyst component (A) in place of tetraisopropoxytitanium. The resulting product is referred to as the catalyst component (3).

(4) The same procedures as in (1) were followed except for using 0.9 mmol of 2,2'-dihydroxy-3,3'-di-t-butyl-5,5'-dimethyldiphenylmethane as the catalyst component (C). The resulting product is referred to as the catalyst component (4).

(5) The same procedures as in (4) were followed except for using 0.9 mmol of titanium tetrachloride as the catalyst component (A). The resulting product is referred to as the catalyst component (5).

(6) The same procedures as in (1) were followed except for using 0.9 mmol of 2,2'-dihydroxy-3,3'-di-t-butyl-5,5'-dimethyldiphenyl sulfide as the catalyst component (C). The resulting product is referred to as the catalyst component (6).

(7) The same procedures as in (6) were followed except for using 0.9 mmol of titanium tetrachloride as the catalyst component (A). The resulting product is referred to as the catalyst component (7).

(8) The same procedures as in (1) were followed except for using 0.9 mmol of 2,2'-dihydroxydiphenyl sulfide as the catalyst component (C). The resulting product is referred to as the catalyst component (8).

(9) The same procedures as in (8) were followed except for using 0.9 mmol of titanium tetrachloride as the catalyst component (A). The resulting product is referred to as the catalyst component (9).

(10) The same procedures as in (1) were followed except for using 0.9 mmol of tetrabutoxytitanium as the catalyst component (A). The resulting product is referred to as the catalyst component (10).

2) Polymerization of 1,3-butadiene

The inner atmosphere of a three-necked flask of 100 ml inner volume equipped with a stirrer was replaced with argon, then 0.009 mmol of the catalyst component obtained above was placed therein and 20 ml of toluene was added thereto to form a solution. After the dissolution, 1.7 mmol of diethylaluminum chloride (hereinafter abbreviated as DEAC) was added thereto. The resulting mixture was stirred at 30° C. for 10 minutes, and then 1,3-butadiene was charged into the flask to a pressure of 0.03 kg/cm$^2$ (gauge pressure) at 30° C. to initiate polymerization. Polymerization was performed with stirring at 30° C. for 3 hours while keeping the pressure of 1,3-butadiene at 0.03 kg/cm$^2$, then the reaction was stopped by addition of 10 ml of isobutanol and the polymer was precipitated with 300 ml of 1N-HCl/methanol. The polymer was collected by filtration and dried under reduced pressure at 60° C. for 2 hours to determine the yield.

The results thus obtained are shown in Table 1.

Comparative Example 1

1,3-Butadiene was polymerized in the same manner as in Example 3 except for using dicyclopentadienyltitanium chloride (Cp$_2$TiCl$_2$, hereinafter abbreviated as DPTC) in place of the catalyst component (1). No polymer was obtained.

The results are shown in Table 1.

Comparative Example 2

Butadiene was polymerized in the same manner as in Example 1 except for using tetrabutoxytitanium (hereinafter abbreviated as TBT) in place of the catalyst component (1). Only a trace amount of polymer was obtained.

TABLE 1

| Example No./ Comp. Example No. | Catalyst component Amount added (mmol) | DEAC Amount added (mmol) | Result of polymerization | |
|---|---|---|---|---|
| | | | Yield (g) | Activity (g/mol catalyst · hour) |
| Example | | | | |
| 1 | ① 0.009 | 1.7 | 1.6 | 5.5 × 10$^4$ |
| 2 | ② 0.009 | 1.7 | 0.2 | 7.4 × 10$^3$ |
| 3 | ③ 0.009 | 1.7 | 0.04 | 1.5 × 10$^3$ |
| 4 | ④ 0.009 | 1.7 | 0.7 | 3.6 × 10$^4$ |
| 5 | ⑤ 0.009 | 1.7 | 0.1 | 3.7 × 10$^3$ |
| 6 | ⑥ 0.009 | 1.7 | 1.5 | 5.5 × 10$^4$ |
| 7 | ⑦ 0.009 | 1.7 | 0.3 | 1.1 × 10$^4$ |
| 8 | ⑧ 0.009 | 1.7 | 1.3 | 4.8 × 10$^4$ |
| 9 | ⑨ 0.009 | 1.7 | 0.7 | 2.6 × 10$^4$ |
| 10 | ⑩ 0.009 | 1.7 | 0.02 | 7.4 × 10$^2$ |
| Compartive Example | | | | |
| 1 | DPTC 0.009 | 1.7 | Trace | — |
| 2 | TBT 0.009 | 1.7 | Trace | — |

Examples 11 to 14

1,3-Butadiene was polymerized in the same manner as in Examples 1 to 10 except that the catalyst component (1) or (2) prepared in Examples 1 to 10 was used and ethylaluminum sesquichloride (hereinafter abbreviated as EASC) or ethylaluminum dichloride (hereinafter abbreviated as EADC) was used respectively in the proportion shown in Table 2 in place of DEAC. The results thus obtained are shown in Table 2.

TABLE 2

| Example No. | Catalyst component Amount added (mmol) | Organo-aluminum Amount added (mmol) | Result of polymerization Yield (g) | Activity (g/mol catalyst · hour) |
|---|---|---|---|---|
| Example | | | | |
| 11 | ① 0.009 | EASC 1.7 | 2.4 | $8.8 \times 10^4$ |
| 12 | ① 0.009 | EADC 1.7 | 5.0 | $1.8 \times 10^5$ |
| 13 | ② 0.009 | EASC 1.7 | 3.3 | $1.0 \times 10^5$ |
| 14 | ② 0.009 | EADC 1.7 | 8.5 | $2.7 \times 10^5$ |

Examples 15 to 19

1,3-Butadiene was polymerized by using the catalyst component (1) or (2) prepared above and by varying the polymerization conditions as shown in Table 3.

The microstructures of the polybutadienes thus obtained are also shown in Table 3.

Table 3 reveals that the trans content can be controlled, within the range of not less than 50%, by selecting suitable polymerization conditions, and the vinyl content can be reduced to as low as 0.

TABLE 3

| Example | Catalyst component Amount added (mmol) | DEAC Amount added (mmol) | Result of polymerization Cis (%) | Trans (%) | Vinyl (%) |
|---|---|---|---|---|---|
| Example | | | | | |
| 15 | ① 0.009 | 1.7 | 41 | 59 | 0 |
| 16[1] | ① 0.009 | 0.8 | 49 | 51 | 1 |
| 17[1] | ② 0.009 | 0.8 | 44 | 55 | 1 |
| 18 | ② 0.009 | 1.7 | 19 | 80 | 1 |
| 19 | ② 0.009 | 3.4 | 2 | 98 | 0 |

Note
Reaction conditions: reaction temperature 30° C., reaction time 3 hours, 1,3-butadiene 0.03 kg/cm² (30° C.), aging 10 minutes
[1]Reaction temperature 40° C.

Butadiene was polymerized by using the catalyst component (1) or (2) and by varying the polymerization conditions. Although the catalyst component (1) or (2) was used in the Examples shown here, it was found that the use of the catalyst component (3) or (4) could also give a trans content of 90% or more when the polymerization conditions were properly selected.

Examples 20 to 29

1) Reaction of catalyst component (A) with catalyst component (C)

(1) In a flask of 100 ml inner volume equipped with a stirrer was placed 0.9 mmol of 2,2'-dihydroxy-3,3'-di-t-butyl-5,5'-dimethyldiphenyl sulfide, the inner atmosphere of the flask was replaced with argon, then 50 ml of dried n-butyl ether was added and stirred to form a solution. Then 0.9 mmol of tetraisopropoxytitanium was added to the solution and allowed to react with stirring at 25° C. for 2 hours. The reaction mixture was then allowed to stand, the supernatant was removed, and the precipitate was collected and washed. The resulting product is referred to as the catalyst component (1).

(2) The same procedures as in (1) were followed except for using 0.9 mmol of titanium tetrachloride as the catalyst component (A) in plane of tetraisopropoxytitanium. The resulting product is referred to as the catalyst component (2).

(3) The same procedures as in (1) were followed except for using 0.9 mmol of titanium tetrabromide as the catalyst component (A) in place of tetraiospropoxytitanium. The resulting product is referred to as the catalyst component (3).

(4) The same procedures as in (1) were followed except for using 0.9 mmol of 2,2'-dihydroxy-3,3'-di-t-butyl-5,5'-dimethyldiphenylmethane as the catalyst component (C). The resulting product is referred to as the catalyst component (4).

(5) The same procedures as in (4) were followed except for using 0.9 mmol of titanium tetrachloride as the catalyst component (A). The resulting product is referred to as the catalyst component (5).

(6) The same procedures as in (1) were followed except for using 0.9 mmol of 2,2'-dihydroxy-3,3'-di-t-butyl-5,5'-dimethyldiphenyl sulfide as the catalyst component (C). The resulting product is referred to as the catalyst component (6).

(7) The same procedures as in (6) were followed except for using 0.9 mmol of titanium tetrachloride as the catalyst component (A). The resulting product is referred to as the catalyst component (7).

(8) The same procedures as in (1) were followed except for using 0.9 mmol of 2,2'-dihydroxydiphenyl sulfide as the catalyst component (C). The resulting product is referred to as the catalyst component (8).

(9) The same procedures as in (8) were followed except for using 0.9 mmol of titanium tetrachloride as the catalyst component (A). The resulting product is referred to as the catalyst component (9).

(10) The same procedures as in (1) were followed except for using 0.9 mmol of tetrabutoxytitanium as the catalyst component (A). The resulting product is referred to as the catalyst component (10).

2) Synthesis of catalyst component (B)

In a flask of 500 ml inner volume equipped with a stirrer, dropping funnel and reflux condenser whose inner atmosphere had been replaced with argon, was suspended 44 g (0.176 mol) of $CuSO_4 \cdot 5H_2O$ in 300 ml of toluene, and a solution consisting of 56 ml (0.58 mol) of trimethylaluminum and 70 ml of toluene was added dropwise thereto over a period of 6 hours with stirring while the inner temperature was kept at 5° C. After completion of the addition, the stirring was continued for 40 hours at an inner temperature kept at 5° C. and further for 20 hours at room temperature. After removal of the precipitate, the solvent was removed under reduced pressure to obtain 13.0 g of methylaluminoxane (hereinafter abbreviated as MAO). For use in polymerization, it was diluted with toluene to a concentration of 0.05 g/ml. In the following Examples was used this methylaluminoxane solution.

3) Polymerization of 1,3-butadiene

In a three-necked flask of 100 ml inner volume equipped with a stirrer whose inner atmosphere had been replaced with argon was placed 5 mg (0.09 mmol) of the catalyst component obtained above, and then 20 ml of toluene was added thereto to form a solution. Then 100 mg (MAO 1.7 mmol) of the methylaluminoxane solution prepared in 2) was added to the solution. The resulting mixture was stirred at 60° C. for 10 minutes, and 1,3-butadiene was charged into the flask to a pressure of 0.03 kg/cm² (gauge pressure) at 60° C. to initiate the polymerization. Polymerization was performed with stirring at 60° C. for 1 hour while keeping the pressure of 1,3-butadiene at 0.03 kg/cm², then the reaction was stopped by addition of 10 ml of isobutanol and the polymer was precipitated with 300 ml of 1N HCl/methanol. The polymer was collected by filtration and dried under reduced pressure at 60° C. for 2 hours to determine the yield. The results thus obtained are shown in Table 4.

TABLE 4

| Example No. and Comp. Example No. | Catalyst component Amount added (mmol) | MAO Amount added (mmol) | Result of polymerization | |
|---|---|---|---|---|
| | | | Yield (g) | Activity (g/mol catalyst · hour) |
| Example | | | | |
| 20 | ① 0.009 | 1.7 | 0.4 | $1.1 \times 10^5$ |
| 21 | ② 0.009 | 1.7 | 0.6 | $2.2 \times 10^5$ |
| 22 | ③ 0.009 | 1.7 | 1.2 | $2.1 \times 10^5$ |
| 23 | ④ 0.009 | 1.7 | 0.6 | $0.8 \times 10^4$ |
| 24 | ⑤ 0.009 | 1.7 | 1.2 | $1.0 \times 10^4$ |
| 25 | ⑥ 0.009 | 1.7 | 0.4 | $1.1 \times 10^5$ |
| 26 | ⑦ 0.009 | 1.7 | 0.6 | $2.2 \times 10^5$ |
| 27 | ⑧ 0.009 | 1.7 | 1.2 | $2.0 \times 10^5$ |
| 28 | ⑨ 0.009 | 1.7 | 0.6 | $2.8 \times 10^5$ |
| 29 | ⑩ 0.009 | 1.7 | 1.2 | $2.7 \times 10^5$ |
| Comparative Example 3 | TBT 0.009 | 1.7 | Trace | — |

Examples 30 to 35

Butadiene was polymerized by using the catalyst component (1) or (2) and by varying the polymerization conditions. Though the catalyst component (1) or (2) was used in the Examples shown here, it was found that the use of the catalyst component (3) or (4) could also give a cis content of 90% or more when the polymerization conditions were properly selected.

Comparative Example 3

Butadiene was polymerized in the same manner as in Example 20 except for using TBT in place of the catalyst component (1). Only a trace amount of polymer was obtained.

TABLE 5

| Example | Catalyst component Amount added (mmol) | MAO Amount added (mmol) | Result of polymerization | | | |
|---|---|---|---|---|---|---|
| | | | Yield (g) | Cis (%) | Trans (%) | Vinyl (%) |
| Example | | | | | | |
| 30 | ① 0.009 | 1.7 | 0.4 | 91 | 6 | 3 |
| 31 | ① 0.002 | 3.4 | 0.6 | 93 | 4 | 3 |
| 32 | ② 0.009 | 1.7 | 1.2 | 90 | 4 | 6 |
| 33 | ② 0.002 | 1.7 | 0.6 | 95 | 2 | 3 |
| 34 | ② 0.002 | 3.4 | 1.2 | 96 | 3 | 1 |
| 35* | ② 0.002 | 1.7 | 0.4 | 93 | 4 | 3 |

Note
Reaction temperature: 60° C., reaction time: 1 hour, aging: 10 minutes, 1,3-butadiene: 0.03 kg/cm²/(60° C.)
*Reaction temperature: 30° C.

By using a catalyst system comprising a transition metal compound of the formula $M(R)_l(OR')_m X_{n-(l+m)}$, an organoaluminum compound and an organic compound having at least two hydroxyl groups, butadiene compounds can be polymerized with a high catalytic activity, and further the content of the trans polymer can be controlled within the range of at least 50% and the vinyl content can be reduced to 0%.

On the other hand, by using a catalyst system comprising a transition metal compound of the formula $M(R)_l(OR')_m X_{n-(l+m)}$, an aluminoxane, and an organic compound having at least two hydroxyl groups, butadiene compounds can be selectively polymerized to a predominantly cis structure and a cis-1,4-polymer content of 90% or more can be obtained merely by adopting suitable polymerization conditions.

What is claimed is:

1. A process for the production of cis-1,4-polybutadiene containing at least 90% of butadiene units linked in cis-1,4-configuration which comprises polymerizing a butadiene compound with a catalyst system comprising catalyst components (A), (B) and (C), wherein the catalyst component (A) is a titanium compound represented by the formula $Ti(R)_l(OR')_m X_{n-(l+m)}$, wherein R and R' independently denote a hydrocarbon group of 1-20 carbon atoms, X denotes a halogen atom, and l, m and n denote numerals satisfying the inequalities $l \geq 0$, $m \geq 0$, $n-(l+m) \geq 0$, n corresponds to the valence of titanium, the catalyst component (B) is an aluminoxane obtained by reaction of a trialkylaluminum with water; and the catalyst component (C) is at least one organic compound having at least two hydroxyl groups represented by the formula I, V or VI HO—R''—(Y)n'—R'''—OH,   (I)

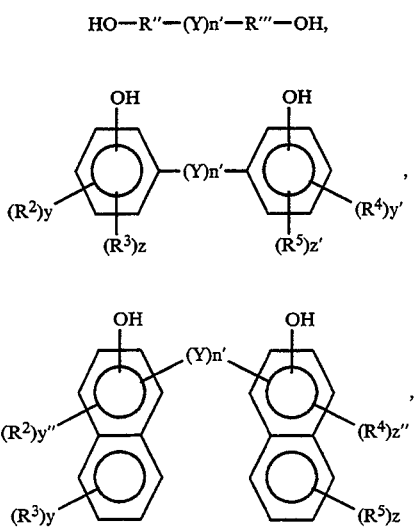

wherein R'' and R''' independently denote a hydrocarbon group of 1-20 carbon atoms; Y denotes a hydrocarbon group of 1-20 carbon atoms,

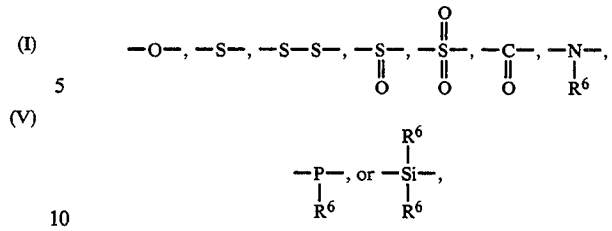

$R^6$ being hydrogen or a hydrocarbon group of 1-6 carbon atoms; $R^2$, $R^3$, $R^4$ and $R^5$ may be the same or different from one another and independently denote a hydrocarbon group of 1-20 carbon atoms, hydroxyl group, nitro group, nitrile group, hydrocarbyloxy group or halogen atom; n' denotes 0 or an integer of 1 or more and represents the number of times of repetition of the unit Y; y, y', y'', z, z' and z'' independently denote the number of substituents bonded to the aromatic ring, y, y', z and z' being independently 0 or an integer of from 1 to 4, and y'' and z'' being 0 or an integer from 1 to 2.

2. A process for the production of cis-1,4-polybutadiene according to claim 1 wherein the catalyst component (B) is an aluminoxane obtained by the reaction of trimethylaluminum or triethylaluminum with water.

* * * * *